United States Patent [19]
Saito et al.

[11] Patent Number: 5,959,983
[45] Date of Patent: Sep. 28, 1999

[54] RADIO COMMUNICATION SYSTEM

[75] Inventors: Naritoshi Saito, Hino; Manabu Ishibe, Hachiouji; Shouichi Oshima, Tokyo; Yoshinori Nagao, Yokosuka, all of Japan

[73] Assignees: Kabushiki Kaisha Toshiba, Kanagawa; NTT Mobile Communications Network, Inc., Tokyo, both of Japan

[21] Appl. No.: 08/663,787

[22] Filed: Jun. 14, 1996

[30] Foreign Application Priority Data

Jun. 16, 1995 [JP] Japan .................................. 7-150384

[51] Int. Cl.$^6$ .................................................. H04B 7/212
[52] U.S. Cl. ............................................ 370/337; 347/442
[58] Field of Search ..................................... 370/337, 347, 370/350, 314, 324, 329, 336, 332; 379/59, 60; 455/33.1, 51.1, 56.1, 434, 422, 423, 424, 428, 447, 450, 502, 515

[56] References Cited

U.S. PATENT DOCUMENTS

| | | | |
|---|---|---|---|
| 5,230,082 | 7/1993 | Ghisler et al. | 455/438 |
| 5,301,356 | 4/1994 | Bodin et al. | 455/436 |
| 5,363,376 | 11/1994 | Chuang et al. | 370/337 |
| 5,528,597 | 6/1996 | Gerszberg et al. | 370/347 |
| 5,613,376 | 3/1997 | Matsuno | 455/502 |

*Primary Examiner*—Chau Nguyen
*Assistant Examiner*—Soon-Dong Hyun
*Attorney, Agent, or Firm*—Finnegan, Henderson, Farabow, Garrett & Dunner, L.L.P.

[57] ABSTRACT

A radio communication system which keeps to a minimum the number of slots which cannot be used due to interference from a neighboring base station, and which can increase the slot usage efficiency. A slot/frame setting unit for a base station extracts the slot/frame timing of a neighboring base station based on the reception output of a radio unit, and sets the communication frame by displacing it in such a way that two slots in the own base station do not coincide in time with a slot of the neighboring base station based on this timing. This setting ensures that there is always just a single slot which cannot be used when interference is detected.

9 Claims, 9 Drawing Sheets

RADIO COMMUNICATION SYSTEM

BACKGROUND OF THE INVENTION

1. Field of the Invention

The present invention relates to a radio communication system having a plurality of base stations respectively connected over a radio channel to a plurality of personal stations in a time division multiple access manner employing a communication frame having a plurality of time slots, and more particularly it relates to a radio communication system in which a plurality of base stations are situated neighboring one another and which alleviates the disadvantages encountered when radio wave interference occurs between the base stations.

2. Description of the Related Art

Figure 6:
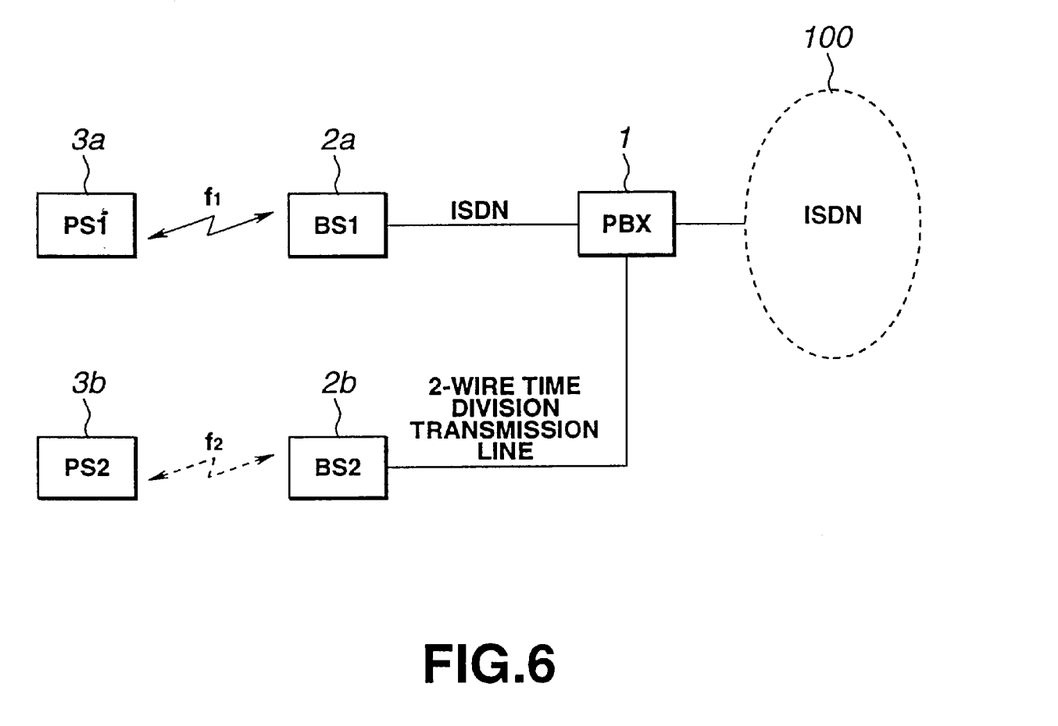
FIG. 6 is a block diagram showing the overall configuration of a general radio communication system of this type.

One example of a known configuration of digital mobile communication system is a radio communication system in which, as shown in FIG. 6, base stations BS1 and BS2 are respectively connected via an ISDN line and a two-wire time division transmission line to a private branch exchange PBX1 which is connected to an ISDN 100, and in which BS1 and BS2 are connected to personal stations PS1 and PS2 over a radio channel.

The transmission and reception timing in this radio communication system is decided by the timing of the slots (time slots) and frames (communication frames) of the base stations. For example, the transmission timing of a first absolute transmission slot in a communication frame of a base station such as BS1 in the figure, which is connected to the private branch exchange PBX1 via the ISDN line, is decided by the arrival timing of a signal through a circuit.

In contrast, with a base station such as BS2 shown in the same figure, which is connected to the private branch exchange PBX1 by the two-wire time division transmission line, the arrival timing of the circuit signal does not necessarily match the ISDN line. Therefore, at present, when a device is constructed as shown in FIG. 6 so that the neighboring base stations BS1 and BS2 are respectively connected to a private branch exchange PBX1 via an ISDN line and two-wire time division transmission line, the slot and frame timings of the base stations are basically asynchronous.

Figure 7:
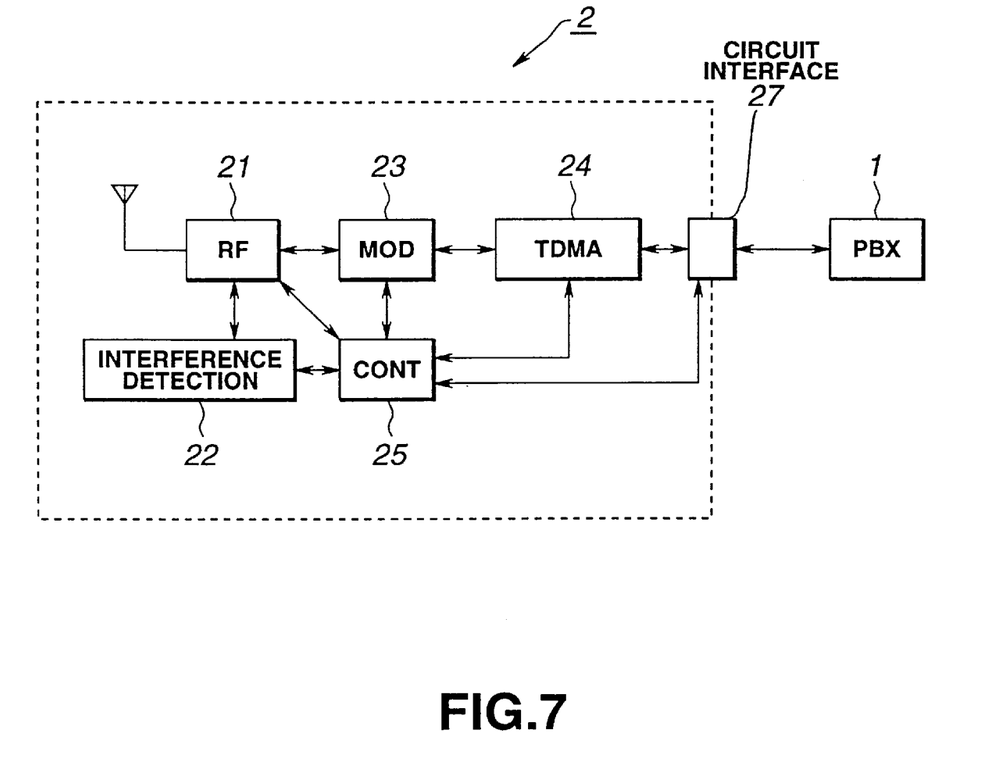
FIG. 7 is a block diagram showing the configuration of a conventional base station in a radio communication system.

Now, in general, base stations in this type of conventional radio communication system are configured as shown in FIG. 7 for example, and are configured so that, when communication is to take place between such a base station and a corresponding personal station, the reception field strength of each slot is detected based on reception output from the radio unit 21, an idle slot is detected based on this reception field strength, and this idle slot is determined to be the communication slot and the communication is thereby able to take place.

Figure 8:
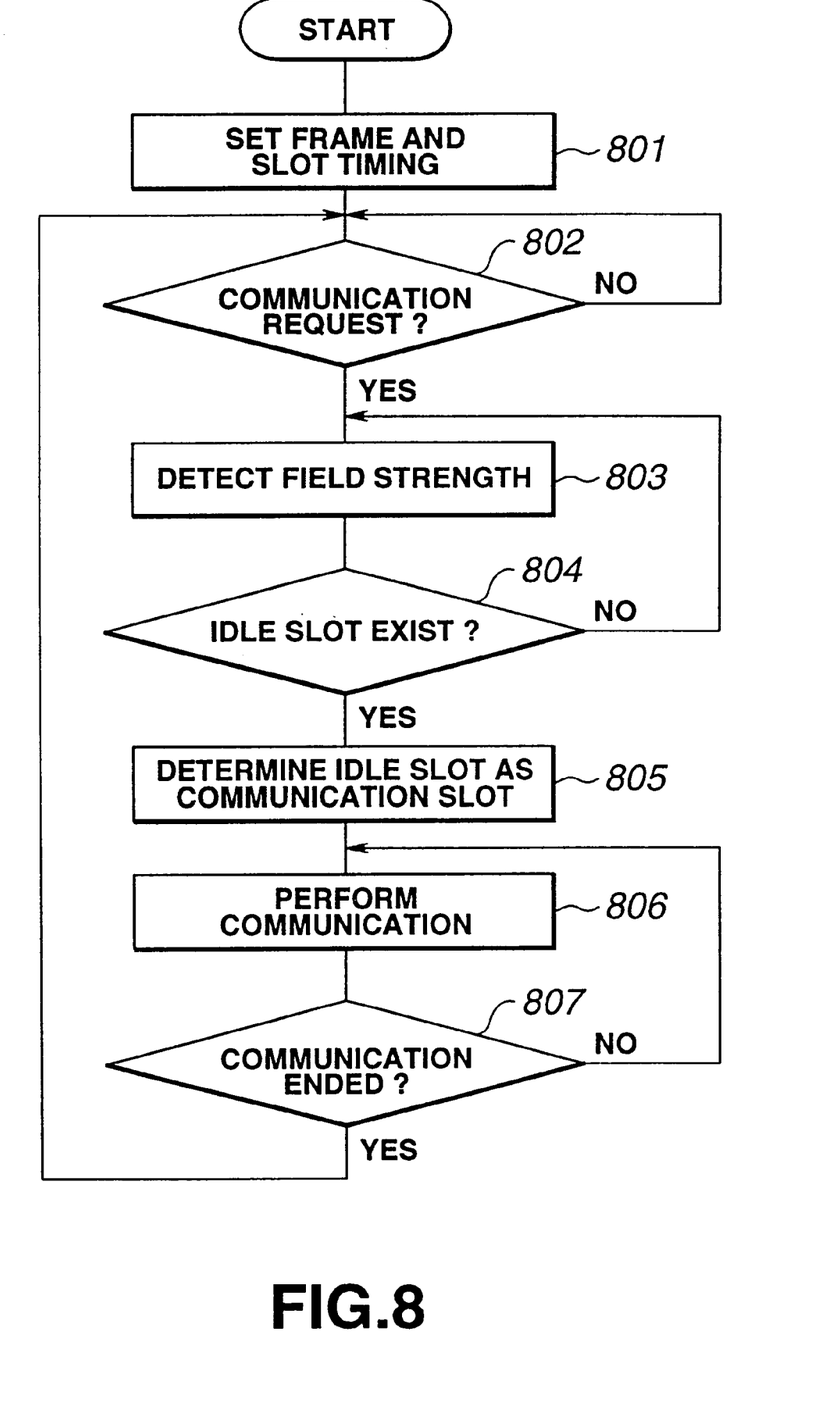
FIG. 8 is a flow chart showing the communication slot determination process for a conventional base station in a radio communication system.

In other words, the communication slot for a base station in a conventional device of this type is determined by a routine such as that shown in FIG. 8. More specifically, the arrangement is such that the frame and slot timing is determined in advance by the specific timing of the base station (Step 801), when there is a communication request (Yes in Step 802) an interference detection unit 22 senses the reception field strengths of the slots fixed by this timing (Step 803), and if there is an idle slot (Yes in step 804) this is determined to be the communication slot (Step 805), the system moves into communication mode (Step 806), and once the communication has finished (Yes in Step 807) it returns to Step 802 ready for the next communication request.

Now, given a conventional device (see FIG. 6) employing base stations 2 of the form shown in FIG. 7, consider the situation where the personal station PS1 and the base station BS1 are communicating with a second slot using a frequency f1 and then the base station BS2 and the personal station PS2 try to start communicating on a frequency f2 which is close to the frequency f1.

Figure 9A:
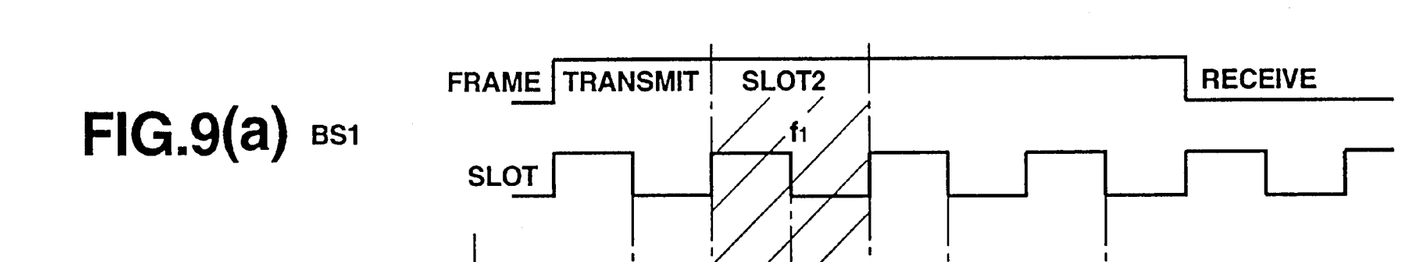
Figure 9B:
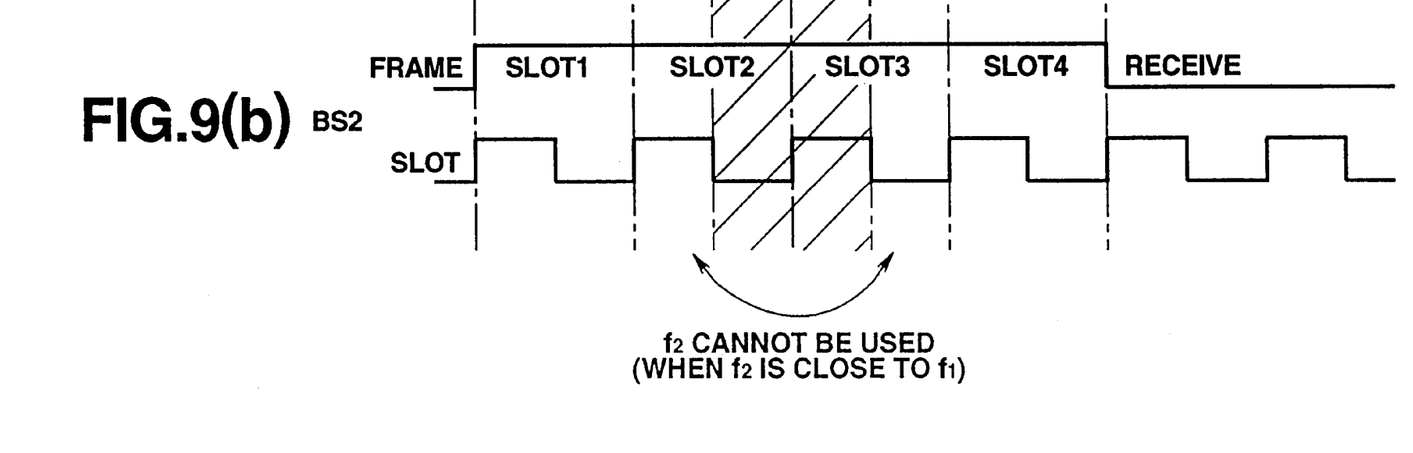

In such a situation, given a conventional device in which the base stations BS1 and BS2 set slots and frames using their own timings and the slot and frame timings are set without taking neighboring base stations into account, it can sometimes happen that the slot and frame timing of the base station BS2, which tries to start communication later, assumes a timing as shown in FIG. 9(b) with respect to the slot and frame timing of the base station BS1 which is already in communication as shown in FIG. 9(a).

More specifically, FIGS. 9(a) and 9(b) show a state in which there are two slots 2 and 3 for the base station BS2 corresponding in time to the slot 2 for the base station BS1, and in this case the interference level detection unit 22 of the base station BS2 judges that neither slot 2 nor slot 3 is an idle slot, which means that the two slots, that is slot 2 and slot 3, cannot be used. As a result, the slot usage efficiency is markedly reduced.

Thus, since the abovementioned conventional radio communication system is so configured that slots/frames are not synchronized between base stations connected to a private branch exchange PBX by separate circuits, it has a problem in that when a base station which is about to start communication detects radio wave interference with a neighboring base station which is already in communication, it can happen that two slots are unable to be used in a timing of the slots/frames of that base station and the slot usage efficiency is markedly reduced.

SUMMARY OF THE INVENTION

An object of the present invention is to provide a radio communication system which eliminates the abovementioned problem, avoids the situation whereby two slots are simultaneously unusable due to radio wave interference with another base station, and improves the slot usage efficiency.

The present invention is configured in such a way that it comprises a plurality of dispersedly situated base stations; and a plurality of personal stations respectively connected over a radio channel to one of the plurality of base stations in a time division multiple access manner employing communication frames, each frame having a plurality of time slots, wherein each of the base stations comprises timing information acquisition means for acquiring information about the timing of the communication frame being used by a neighboring base station; and communication frame setting means for setting a timing of a communication frame used by own base station in such a way that time slots of the communication frame used by own base station are synchronous with time slots of a communication frame being used by the neighboring base station based on the information about the timing of the communication frame being used by the neighboring base station which has been acquired by the timing information acquisition means.

More specifically, in the present invention, information about the frame and slot timing being used by the neighboring base station is acquired by the timing data acquisition means, the timing of the communication frame used by own base station is set in such a way that at least the time slots of the communication frame used by own base station are synchronous with the time slots of the communication frame being used by the neighboring base station, and then an idle channel is found to determine the communication channel, and communication takes place.

Using such a configuration makes it possible to improve the slot usage efficiency when a neighboring base station communicates with a personal station on a frequency which is close to a frequency which is already in use, with only a single communication slot unused even when interference has been detected.

Here, the configuration can be such that the timing information acquisition means comprises interference detection means for detecting radio wave interference with the neighboring base station; and time slot timing distinguishing means for distinguishing a timing of the time slots of the communication frame being used by the neighboring base station based on the detection output of the interference detection means, and the communication frame setting means comprises time slot timing setting means for setting a timing of the time slots of the communication frame used by own base station in such a way that the time slots of the communication frame used by own base station are synchronous with the time slots of the communication frame used by the neighboring base station based on the timing of the time slots of the communication frame being used by the neighboring base station distinguished by the time slot timing distinguishing means.

Further, the timing information acquisition means may comprise interference detection means for detecting radio wave interference with the neighboring base station; first distinguishing means for distinguishing a timing of the time slots of the communication frame being used by the neighboring base station based on the detection output of the interference detection means; and second distinguishing means for distinguishing a timing of the communication frame being used by the neighboring base station based on time slot information sent from the neighboring base station in a time slot where there is radio wave interference with the neighboring base station detected by the interference detection means, and the communication frame setting means comprises: timing setting means for setting a timing of the time slots of the communication frame used by own base station in such a way that the time slots of the communication frame used by own base station are synchronous with the time slots of the communication frame used by the neighboring base station based on the timing of the time slots of the communication frame being used by the neighboring base station distinguished by the first distinguishing means, and also for setting a timing of the communication frame used by own base station in such a way that the timing of the communication frame used by own base station is synchronous with the timing of the communication frame used by the neighboring base station based on the timing of the communication frame being used by the neighboring base station distinguished by the second distinguishing means.

Further, the configuration can be such that the plurality of base stations comprises a first base station connected to a private branch exchange via a first circuit including information for determining the timing of the communication frame; and a second base station situated neighboring the first base station and connected to the private branch exchange via a second circuit which does not include information for determining the timing of the communication frame, the timing information acquisition means and the communication frame setting means being provided in the second base station.

Here, the configuration can be such that the first circuit comprises an ISDN line, and the second circuit comprises a two-wire time division transmission line.

Further, the configuration can be such that a base station is connected to a circuit including information for determining the timing of the communication frame, and the timing information acquisition means acquires timing information about the communication frame being used by the neighboring base station based on the information for determining the timing of the communication frame included in the circuit.

Here, the configuration can be such that the circuit comprises an ISDN line.

Further, the configuration can be such that the base station is connected to a first private branch exchange via a first ISDN line, the neighboring base station is connected via a second ISDN line to a second private branch exchange connected by wires to the first private branch exchange, and wherein the first private branch exchange comprises timing management means for managing the displacement in the timing of the communication frame from the second private branch exchange; and timing control means for controlling the timing of information for determining the timing of the communication frame included in the first ISDN line based on the displacement of the timing of the communication frame from the second private branch exchange managed by the timing management means.

Further, the present invention is a base station respectively connected over a radio channel to a plurality of personal stations in a time division multiple access manner employing communication frames, each frame having a plurality of time slots, comprising timing information acquisition means for acquiring information about the timing of communication frames being used by a neighboring base station; and communication frame setting means for setting the timing of the communication frame used by own base station in such a way that at least the time slots of the communication frame used by own base station are synchronous with the time slots of the communication frame being used by the neighboring base station based on information about the timing of the communication frame being used by the neighboring base station which has been acquired by the timing information acquisition means.

Here, the configuration can be such that the timing information acquisition means comprises interference detection means for detecting radio wave interference with the neighboring base station; and time slot timing distinguishing means for distinguishing the timing of the time slots of the communication frame being used by the neighboring base station based on the detection output of the interference detection means, and the communication frame setting means comprises time slot timing setting means for setting the timing of the time slots of the communication frame used by own base station in such a way that the time slots of the communication frame used by own base station are synchronous with the time slots of the communication frame used by the neighboring base station based on the timing of the time slots of the communication frame being used by the neighboring base station distinguished by the time slot timing distinguishing means.

Further, the configuration can be such that the timing information acquisition means comprises interference detection means for detecting radio wave interference with the neighboring base station; first distinguishing means for distinguishing the timing of the time slots of the communication frame being used by the neighboring base station based on the detection output of the interference detection means; and second distinguishing means which distinguishes the timing of the communication frame being used by the neighboring base station based on time slot information sent from the neighboring base station in time slots where there is radio wave interference between it and the neighboring base station detected by the interference detection means, and the communication frame setting means comprises timing setting means for setting the timing of the time slots of the communication frame used by own base station in such a way that the time slots of the communication frame used by own base station are synchronous with the time slots of the communication frame used by the neighboring base station based on the timing of the time slots of the communication frame being used by the neighboring base station distinguished by the first judgement means, and also setting the timing of the communication frame used by own base station in such a way that the timing of the communication frame used by own base station is synchronous with the timing of the communication frame used by the neighboring base station based on the timing of the communication frame being used by the neighboring base station distinguished by the second distinguishing means.

Further, the configuration can be such that the base station is connected to a circuit including information for determining the timing of the communication frame, and the timing information acquisition means acquires timing information about the communication frame being used by the neighboring base station based on information for determining the timing of the communication frame included in the circuit.

Here, the configuration can be such that the circuit comprises an ISDN line.

BRIEF DESCRIPTION OF THE DRAWINGS

FIG. 9($a$) and 9($b$) are time charts showing an example of the setting of the communication frames and slots for a conventional base station in a radio communication system.

DESCRIPTION OF THE PREFERRED EMBODIMENTS

Figure 1:
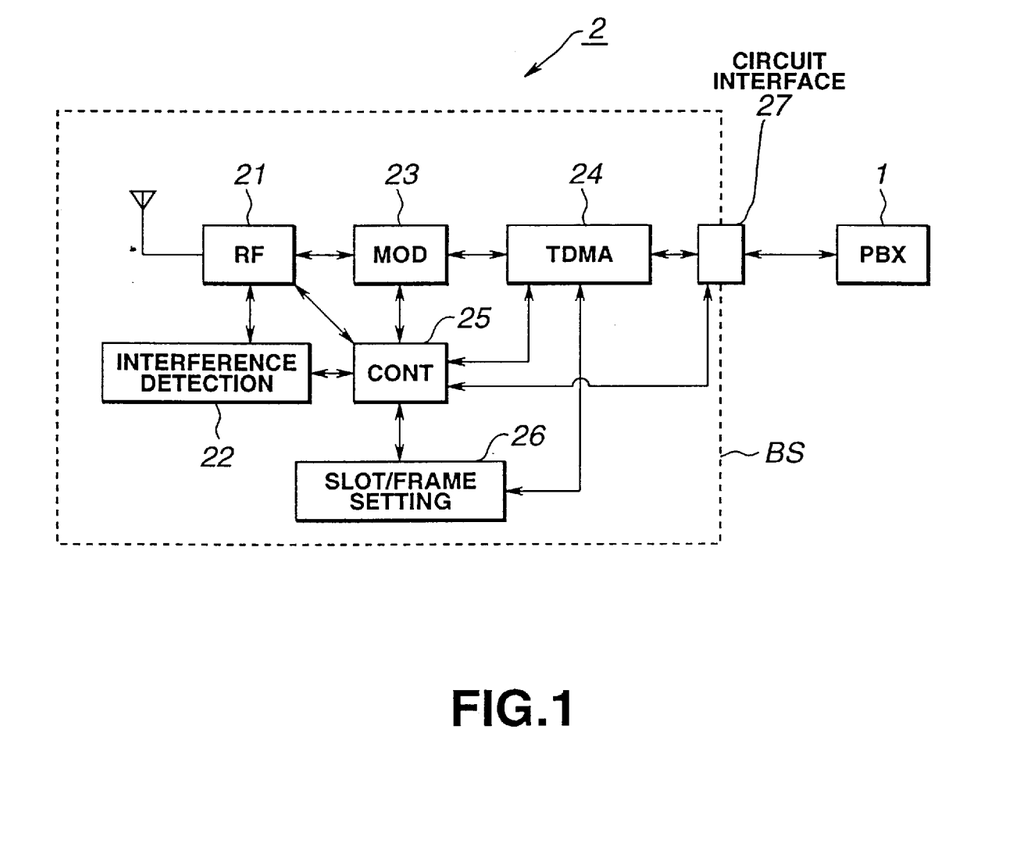
FIG. 1 is a block diagram showing the configuration of a base station in a radio communication system according to one embodiment of the present invention.

Embodiments of the present invention are described in detail below with reference to the attached drawings. FIG. 1 is a block diagram showing the configuration of a base station in a radio communication system according to one embodiment of the present invention. The base station 2 in this embodiment comprises a radio unit 21 which sends and receives radio signals, an interference detection unit 22 which monitors whether there is a carrier or not and outputs the interference level using the field strength or the like, a modem unit 23 which controls the modulation and demodulation and clock synchronization of the baseband signal, a TDMA (time division multiplex access) unit 24 which compresses and decompresses voice data and generates TDMA data, a control unit 25 which controls the various other units, a slot/frame setting unit 26 which sets the frame and slot timing using reception data or the like, and a circuit interface unit 27 which governs the connection with an ISDN line or a two-wire time division transmission line.

The base station 2 in this embodiment has a configuration involving the addition of the slot/frame setting unit 26 to the conventional base station 2 shown in FIG. 7, and this base station 2 can be accommodated by a private branch extension PBX1 via an ISDN line or two-wire time division line to constitute the radio communication system shown in FIG. 6.

In the following, we will assume that the radio communication system of the present invention in FIG. 6 is employing base stations 2 with the configuration shown in FIG. 1 as the base stations BS1 and BS2, and we will consider a situation involving this device when the base station BS1 and the personal station PS1 are already communicating using slot 2 on a frequency f1 and then the base station BS2 and the personal station PS2 start communicating on a frequency f2 which is close to the frequency f1.

As also described in the context of the prior art, the transmission timing for the first absolute transmission slot of the radio frame of the base station BS1, which is connected with the private branch exchange PBX1 via an ISDN line, is decided by the arrival timing of the circuit signal.

Meanwhile, the base station BS2 which is connected to the private branch exchange PBX1 by the two-wire time division transmission line does not have any specific rules such as those of the ISDN line relating to the transmission timing of the first absolute transmission slot of the radio frame.

Thus, with the abovementioned radio communication system of the present invention, when the base station BS1 and the personal station PS1 are communicating using slot 2 on a frequency f1 and then the base station BS2 and the personal station PS2 try to start communicating on a frequency f2 which is close to the frequency f1, the frame and slot timing which occurs between these base stations BS1 and BS2 is sometimes like that shown in FIGS. 9($a$) and 9($b$). More specifically, this timing represents a situation in which both of the slots 2 and 3 in the base station BS2 correspond in time to the slot 2 currently being used in the base station BS1.

At this time (the timing shown in FIGS. 9($a$) and 9($b$)), in the conventional device in which the base stations BS1 and BS2 set the slot and frame using their own specific timings and do not take the neighboring BS into account in setting the slot and frame timings, the base station BS2, which tries to start communicating later, judges that slot 2 and slot 3 are not idle slots due to the interference detected by the interference detection unit 22, these two slots are unable to be used and the slot usage efficiency is markedly reduced.

In order to resolve this, in this embodiment the base stations BS comprise a slot/frame setting unit 26 (see FIG. 1) in such a way as to allow the base station BS itself to set own slot and frame timing while continuously grasping the slot and frame timing of the neighboring base station BS based on reception data or the like from that base station BS, so that the slot usage efficiency is improved.

Figure 2:
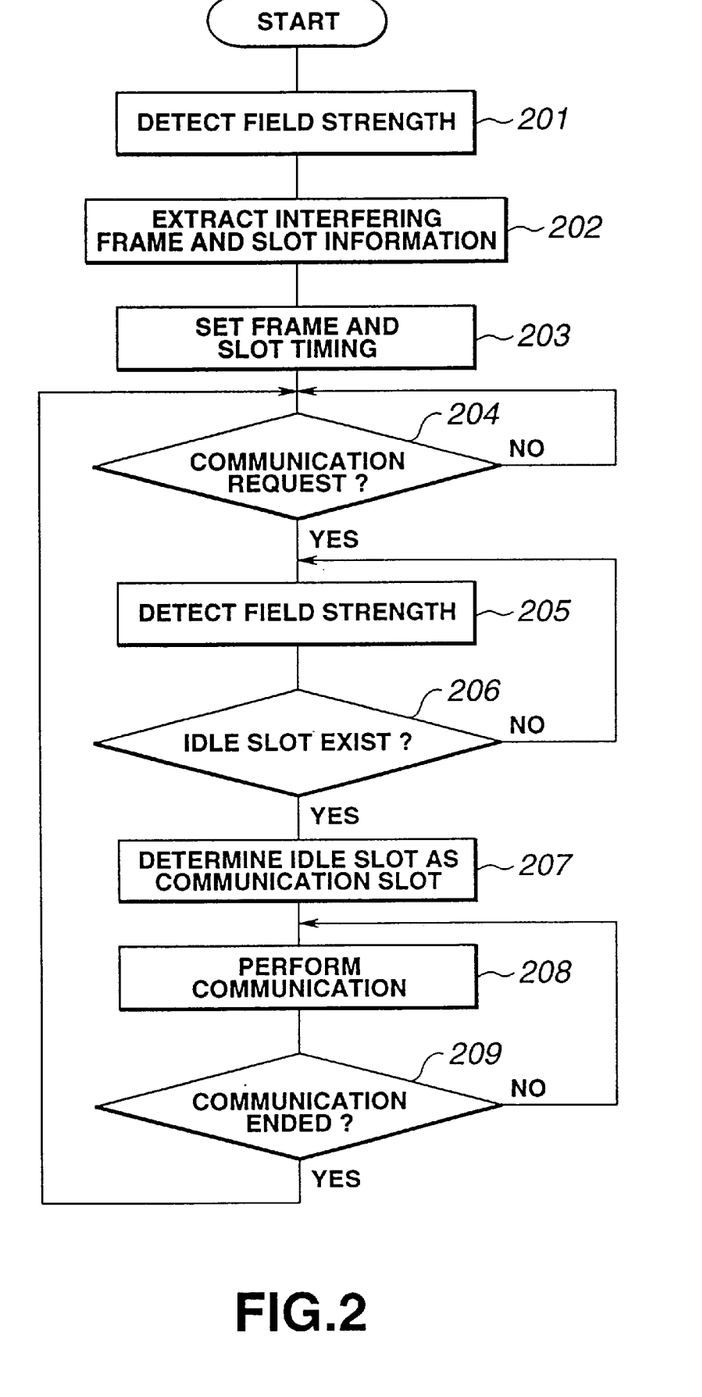
FIG. 2 is a flow chart showing the communication slot determination process for the base station in the radio communication system in the embodiment shown in FIG. 1.

In this embodiment, the process whereby the base station 2 itself determines the communication slot is, for example, carried out in accordance with the flow chart shown in FIG. 2. More specifically, in the base station 2 in this embodiment the first thing that happens is that the interference detection unit 22 detects the reception field strength of the radio signal from the neighboring base station BS (Step 201).

Next, frame and slot information regarding the neighboring base station BS is extracted by the control unit 25 based on the reception field strength in the base station 2 (Step 202), and the slot/frame setting unit 26 sets the frame and slot timing of the own base station 2 based on the extracted frame and slot information (Step 203).

Here, it sets the frame and slot timing of the own base station 2 in such a way that the timing of the slots used by the own base station 2 matches, or in other words is synchronous with at least the timing of the slots of the communication-frame used by the neighboring base station.

Then, when there is a communication request (Yes in Step 204) the interference detection unit 22 senses the reception field strengths of the slots fixed by this timing (Step 205), and if there is an idle slot (Yes in step 206) this is determined to be the communication slot (Step 207), the system moves into communication mode (Step 208), and once the communication has finished (Yes in Step 209) it returns to Step 204 ready for the next communication request.

One example of communication slots determined by such a process is shown in FIG. 3. It will be noted that FIG. 3 is a timing chart for a radio communication system of this embodiment having a basic configuration such as that shown in FIG. 6 in which the base stations 2 with the configuration shown in FIG. 1 are employed as the base stations BS1 and BS2, and it corresponds to the process run in the base station BS2 in setting the own frame and slots when the base station BS1 and the personal station PS1 are communicating using slot 2 on a frequency f1 and then the base station BS2 and the personal station PS2 try to start communicating on a frequency f2 which is close to the frequency f1.

Figure 3A:
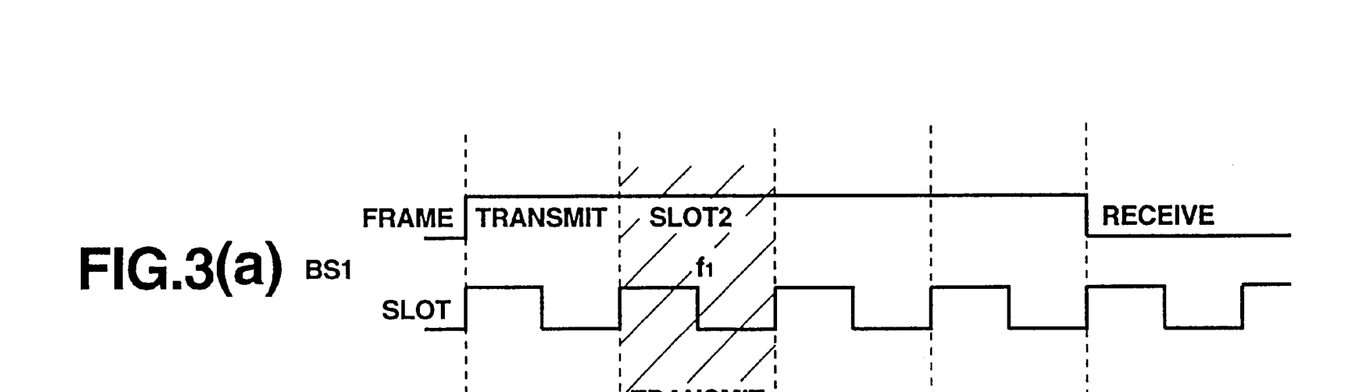
FIG. 3 is a time chart showing an example of the setting of communication frame and slots in a base station in a radio communication system according to the present invention.
Figure 3B:
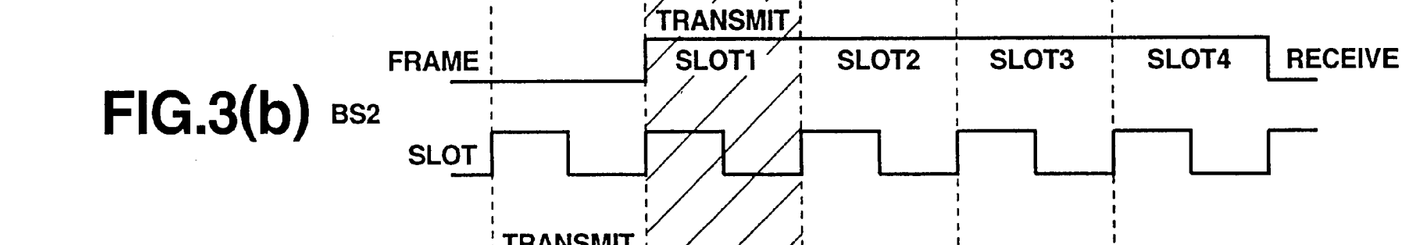

FIG. 3(b) in particular shows an example in which, in base station BS2, its frame and slots have been displaced so that only the slot 1 in the own base station BS2 corresponds in time to slot 2 used by the base station BS1 shown in FIG. 3(a).

More specifically, in FIG. 3(b), there is a synchronous relationship between the slots used by the neighboring base station BS1 and the slots used in the own base station BS2, but the communication frame used by the neighboring base station BS1 and the communication frame used in the own base station BS2 are not completely synchronous.

In such a process of frame and slot setting, it is sufficient to extract a slot where there is wave interference as slot information in the process of extracting frame and slot information regarding wave interference in Step 202 of the flow chart shown in FIG. 2. In other words, in this case, in the process of setting the frame and slot timing in Step 203 of the flow chart shown in FIG. 2, the communication frame in the own base station BS2 may be set in such a way that the slots of the communication frame used in the own base station BS2 are synchronous with the timing of slots where it has been detected that there is wave interference in the detection of the field strength in Step 201 of the flow chart shown in FIG. 2.

Figure 3C:
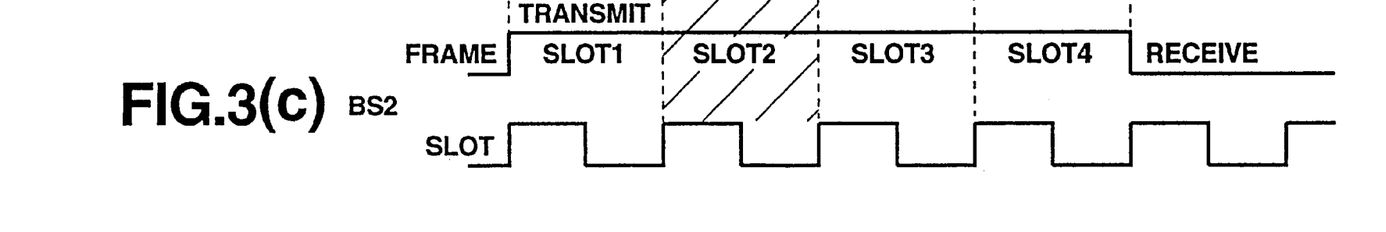

Further, FIG. 3(c) shows an example in which, in base station BS2, own frame and slots have been displaced so that only slot 2 in the own base station corresponds in time to slot 2 used by the base station BS1 shown in FIG. 3(a).

In this case, the slots used by the neighboring base station BS1 and the slots used in the own base station BS2 are synchronized, and the communication frame used by the neighboring base station BS1 and the communication frame used in the own base station BS2 are synchronized.

In this case, in the process of extracting frame and slot information regarding wave interference in Step 202 of the flow chart shown in FIG. 2, the slot where there is wave interference is extracted as slot information and a discrimination is made from the information contained in this slot as to what number slot it is in the slots used by the neighboring base station BS1, and this is used to set the communication frame used in the own base station BS2.

It will be noted that in both FIG. 3(b) and 3(c) the adjustments have been made so that two of the slots used by BS2 do not simultaneously correspond to one of the slots used by the base station BS1 and, therefore, even if interference is detected at this time, there is no more than one slot in the base station BS2 which cannot use the frequency f2 neighboring the frequency f1 being used by the base station BS1.

In this embodiment, by having a function whereby the base station BS itself varies the frame and slot timing in this way, it is possible to have just one slot which cannot be used using neighboring frequencies, and it is possible to drastically improve the slot usage efficiency compared to conventional devices which have been unable to vary frames and slots and in which two slots in a own base station BS have corresponded in time to one slot being used by a neighboring base station BS such that both have been unusable.

It will be noted that the above embodiment discloses a method in which the data for determining the communication slot of the own base station BS is obtained by the reception of the radio signal from the neighboring base station BS, but it is possible to configure a system in such a way that this type of data is obtained through a wire transmission from a neighboring system element, not through a reception of radio signals.

Figure 4:
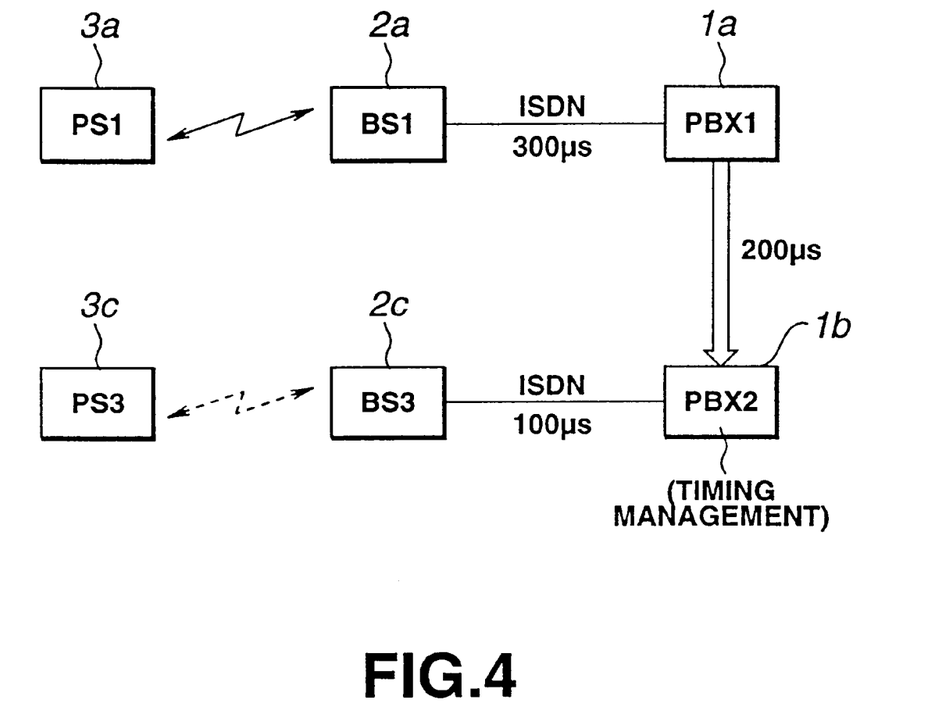
FIG. 4 is a block diagram showing the overall configuration of a radio communication system according to another embodiment of the present invention.

FIG. 4 shows the overall configuration of a radio communication system according to another embodiment of the present invention based on this principle. This device is configured in such a way that base stations BS1 and BS3 are connected to two private branch exchanges PBX1 and private branch exchange PBX2 via respective ISDN lines, and personal stations PS1 and PS3 are connected to the base stations BS1 and BS2 via radio circuits.

This radio communication system is characterized in that, in the base stations BS1 and BS3, the setting of the frame and slot timing of the own base station BS is carried out with reference not only to the radio reception information from the neighboring base station BS but also to information on the ISDN line transmitted from the private branch exchanges PBX2 and PBX1 connecting the neighboring base station BS.

Here, in the ISDN line between the private branch exchange PBX1 and the base station BS1, for example, the timing of the first transmission slot in the base station BS1 is based on the arrival time of ISDN data from the network and is decided to be 300 $\mu$s after the arrival time.

Further, when the private branch exchange PBX1 and the base station BS1 are communicating in accordance with this rule, it is assumed that it is already known from measurements that there is a 200 $\mu$s delay between the private branch exchange PBX1 and the private branch exchange PBX2.

In this case, the timing of the first transmission slot in the base station BS3 can be set at 100 μs from the arrival time of ISDN data from the private branch exchange PBX2 so that the timing of communication frames between the base station BS1 and base station BS3 matches.

Such processing can be achieved by providing a timing management unit which manages this timing displacement in the private branch exchange PBX2.

Figure 5:
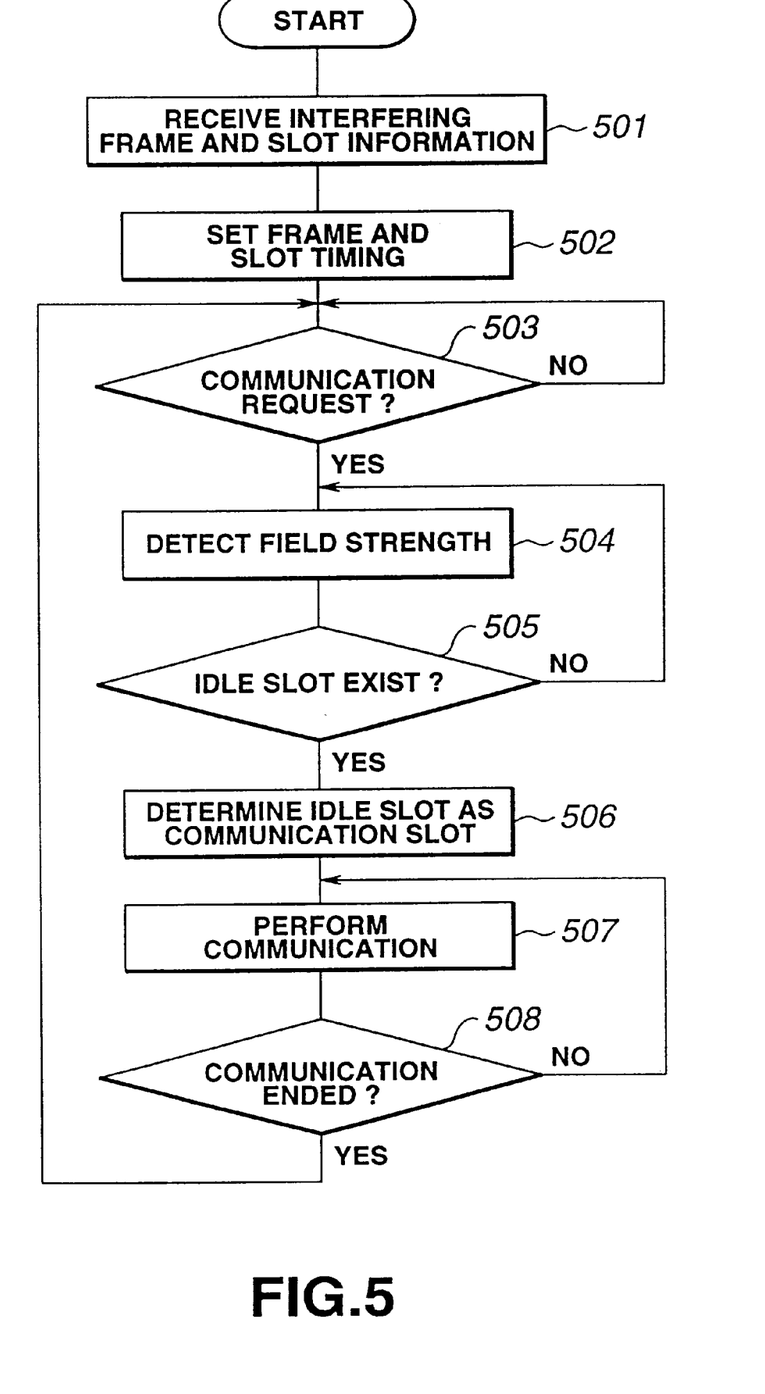
FIG. 5 is a flow chart showing the communication slot determination process for the base station in the radio communication system of the embodiment shown in FIG. 4.

By way of example, in this embodiment, the process by which the base station 2 determines the transmission slots can be carried out in accordance with the flow chart shown in FIG. 5. More specifically, the first thing that happens in base station 2 in this embodiment is that information is received based on the timing displacement managed by the timing management unit provided in the private branch exchange PBX, which is to say the frame and slot information of the neighboring base station BS from information transmitted on the ISDN line (Step 501), and the frame and slot timing of the own base station is set based on the extracted frame and slot information (Step 502).

Then, when there is a communication request (Yes in Step 503) the reception field strength for the slot fixed by this timing is sensed (Step 504), and if there is an idle slot (Yes in step 504) this idle slot is determined to be the communication slot (Step 506), the system moves into communication mode (Step 507), and once the communication has finished (Yes in Step 508) it returns to Step 503 ready for the next communication request.

In the radio communication system of this embodiment, because the slots and frames of the own base station BS are determined based on the timing of the neighboring base station BS, it can be expected that the number of slots which cannot be used due to interference is one, and, as far as slot usage efficiency is concerned, the same effect can be expected as in the case where the communication slot is set based on the radio reception signal.

In addition, it goes without saying that the present invention can be modified other than in the embodiments above without departing from its essence.

Thus, because the present invention is arranged in such a way that, when starting communication between a base station and a personal station, the frame and slot timing is set by obtaining frame and slot timing information from a neighboring base station, an idle channel is then found and communication starts, the number of communication slots which cannot be used when a neighboring base station communicates with a personal station on a frequency close to a frequency already in use can be held at one even when interference is detected, and the slot usage efficiency can be kept extremely high.

What is claimed is:

1. Radio communication system comprising:
   a plurality of dispersedly situated base stations; and
   a plurality of personal stations respectively connected over a radio channel to one of the base stations in a time division multiple access manner employing communication frames, each frame having a plurality of time slots;
   wherein each of the base stations comprises:
      timing information acquisition means for acquiring information about a timing of the communication frame and the time slots being used by a neighboring base station, comprising
         interference detection means for detecting radio wave interference with the neighboring base station; and
      time slot timing distinguishing means for distinguishing the timing of the time slots of the communication frame being used by the neighboring base station based on the detection output of the interference detection means; and
   communication frame setting means for setting a timing of the communication frame used by the one base station in such a way that the time slots of the communication frame used by the one base station are synchronous with the time slots of the communication frame being used by the neighboring base station based on the information about the timing of the communication frame and time slots being used by the neighboring base station which have been acquired by the timing acquisition means, comprising
      time slot timing setting means for setting the timing of the time slots of the communication frame used by the one base station in such a way that the time slots of the communication frame used by the one base station are synchronous with the time slots of the communication frame used by the neighboring base station based on the timing of the time slots of the communication frame being used by the neighboring base station distinguished by the time slot timing distinguishing means.

2. Radio communication system as claimed in claim 1, wherein the one base station is connected to a circuit including information for determining the timing of the communication frame, and the timing information acquisition means acquires timing information about the communication frame being used by the neighboring base station based on the information for determining the timing of the communication frame included in the circuit.

3. Radio communication system comprising:
   a plurality of dispersedly situated base stations; and
   a plurality of personal stations respectively connected over a radio channel to one of the base stations in a time division multiple access manner employing communication frames, each frame having a plurality of time slots;
   wherein each of the base stations comprises:
      timing information acquisition means for acquiring information about a timing of the communication frame and the time slots being used by a neighboring base station, comprising
         interference detection means for detecting radio wave interference with the neighboring base station;
         first distinguishing means for distinguishing the timing of the time slots of the communication frame being used by the neighboring base station based on the detection output of the interference detection means; and
         second distinguishing means for distinguishing the timing of the communication frame being used by the neighboring base station based on time slot information sent from the neighboring base station in a time slot where there is radio wave interference with the neighboring base station detected by the interference detection means; and
      communication frame setting means for setting a timing of the communication frame used by the one base station in such a way that the time slots of the communication frame used by the one base station are synchronous with the time slots of the communication frame being used by the neighboring base station based on the information about the timing of the communication frame and time slots being used by the neighboring base station which have been acquired by the timing acquisition means, comprising timing setting means for setting a timing of the time slots of the communication frame used by the one base station in such a way that the time slots of the communication frame used by the one base station are synchronous with the time slots of the communication frame used by the neighboring base station based on the timing of the time slots of the communication frame being used by the neighboring base station distinguished by the first distinguishing means, and also for setting the timing of the communication frame used by the one base station in such a way that the timing of the communication frame used by the one base station is synchronous with the timing of the communication frame used by the neighboring base station based on the timing of the communication frame being used by the neighboring base station distinguished by the second distinguishing means.

4. Radio communication system as claimed in claim 3, wherein the one base station is connected to a circuit including information for determining the timing of the communication frame, and the timing information acquisition means acquires timing information about the communication frame being used by the neighboring base station based on the information for determining the timing of the communication frame included in the circuit.

5. Radio communication system comprising:
a plurality of dispersedly situated base stations; and
a plurality of personal stations respectively connected over a radio channel to one of the base stations in a time division multiple access manner employing communication frames, each frame having a plurality of time slots;
wherein the plurality of base stations comprises:
a first base station connected to a private branch exchange via an ISDN line including information for determining a timing of the communication frame; and
a second base station situated neighboring the first base station and connected to the private branch exchange via a two-wire time division transmission line which does not include information for determining the timing of the communication frame, the second base station comprising
timing information acquisition means for acquiring information about the timing of the communication frame being used by the first base station; and
communication frame setting means for setting the timing of the communication frame used by the second base station in such a way that time slots of the communication frame used by the second base station are synchronous with time slots of the communication frame being used by the first base station based on the information about the timing of the communication frame being used by the first base station which has been acquired by the timing information acquisition means.

6. Radio communication system as claimed in claim 5, wherein the first base station is connected to a circuit including information for determining the timing of the communication frame, and the timing information acquisition means acquires timing information about the communication frame being used by the neighboring base station based on the information for determining the timing of the communication frame included in the circuit.

7. Radio communication system comprising:
a plurality of dispersedly situated base stations; and
a plurality of personal stations respectively connected over a radio channel to one of the base stations in a time division multiple access manner employing communication frames, each frame having a plurality of time slots;
wherein each of the base stations comprises:
timing information acquisition means for acquiring information about a timing of the communication frame and the time slots being used by a neighboring base station; and
communication frame setting means for setting a timing of the communication frame used by the one base station in such a way that the time slots of the communication frame used by the one base station are synchronous with the time slots of the communication frame being used by the neighboring base station based on the information about the timing of the communication frame and the time slots being used by the neighboring base station which have been acquired by the timing acquisition means;
wherein the plurality of base stations comprises the one base station connected to a first private branch exchange via a first ISDN line including information for determining the timing of the communication frame and the neighboring base station connected via a second ISDN line to a second private branch exchange connected by wires to the first private branch exchange,
wherein the timing information acquisition means acquires timing information about the communication frame being used by the neighboring base station based on the information for determining the timing of the communication frame included in the first ISDN line, and wherein the first private branch exchange comprises:
timing management means for managing a displacement in the timing of the communication frame from the second private branch exchange; and
timing control means for controlling the timing of information for determining the timing of the communication frame included in the first ISDN line based on the displacement of the timing of the communication frame from the second private branch exchange managed by the timing management means.

8. Base station respectively connected over a radio channel to a plurality of personal stations in a time division multiple access manner employing communication frames, each frame having a plurality of time slots, comprising:
timing information acquisition means for acquiring information about a timing of the communication frame being used by a neighboring base station, comprising interference detection means for detecting radio wave interference with the neighboring base station; and
time slot timing distinguishing means for distinguishing the timing of the time slots of the communication frame being used by the neighboring base station based on the detection output of the interference detection means; and
communication frame setting means for setting the timing of the communication frame used by the one base station in such a way that at least the time slots of the communication frame used by the one base station are synchronous with the time slots of the communication frame being used by the neighboring base station based on information about the timing of the communication frame being used by the neighboring base station which has been acquired by the timing information acquisition means, comprising     time slot timing setting means for setting the timing of the time slots of the communication frame used by the one base station in such a way that the time slots of the communication frame used by the one base station are synchronous with the time slots of the communication frame used by the neighboring base station based on the timing of the time slots of the communication frame being used by the neighboring base station distinguished by the time slot timing distinguishing means.

9. Base station respectively connected over a radio channel to a plurality of personal stations in a time division multiple access manner employing communication frames, each frame having a plurality of time slots, comprising:

timing information acquisition means for acquiring information about a timing of the communication frame being used by a neighboring base station, comprising interference detection means for detecting radio wave interference with the neighboring base station;

first distinguishing means for distinguishing the timing of the time slots of the communication frame being used by the neighboring base station based on the detection output of the interference detection means; and     second distinguishing means for distinguishing the timing of the communication frame being used by the neighboring base station based on time slot information sent from the neighboring base station in time slots where there is radio wave interference with the neighboring base station detected by the interference detection means; and communication frame setting means for setting a timing of the communication frame used by the one base station in such a way that at least the time slots of the communication frame used by the one base station are synchronous with the time slots of the communication frame being used by the neighboring base station based on information about the timing of the communication frame being used by the neighboring base station which has been acquired by the timing information acquisition means, comprising     timing setting means for setting the timing of the time slots of the communication frame used by the one base station in such a way that the time slots of the communication frame used by the one base station are synchronous with the time slots of the communication frame used by the neighboring base station based on the timing of the time slots of the communication frame being used by the neighboring base station distinguished by the first distinguishing means, and also setting the timing of the communication frame used by the one base station in such a way that the timing of the communication frame used by the one base station is synchronous with the timing of the communication frame used by the neighboring base station based on the timing of the communication frame being used by the neighboring base station distinguished by the second distinguishing means.

\* \* \* \* \*